United States Patent
Nakagawa

(10) Patent No.: US 8,223,016 B2
(45) Date of Patent: Jul. 17, 2012

(54) CAPACITIVE OCCUPANT DETECTION SYSTEM

(75) Inventor: Hajime Nakagawa, Nagoya (JP)

(73) Assignee: Denso Corporation, Kariya (JP)

( * ) Notice: Subject to any disclaimer, the term of this patent is extended or adjusted under 35 U.S.C. 154(b) by 398 days.

(21) Appl. No.: 12/653,121

(22) Filed: Dec. 8, 2009

(65) Prior Publication Data

US 2010/0148548 A1  Jun. 17, 2010

(30) Foreign Application Priority Data

Dec. 11, 2008  (JP) ................................. 2008-316124

(51) Int. Cl.
*G08B 21/00* (2006.01)

(52) U.S. Cl. ................... 340/540; 340/425.5; 297/217.2

(58) Field of Classification Search .................... 340/540
See application file for complete search history.

(56) References Cited

U.S. PATENT DOCUMENTS

| | | | |
|---|---|---|---|
| 7,401,532 | B2 | 7/2008 | Wanami |
| 7,436,315 | B2 | 10/2008 | Kamizono et al. |
| 7,497,465 | B2 | 3/2009 | Wato et al. |
| 2003/0090376 | A1 | 5/2003 | Thompson et al. |
| 2004/0111201 | A1 | 6/2004 | Thompson et al. |
| 2006/0187038 | A1* | 8/2006 | Shieh et al. .................. 340/562 |
| 2008/0018143 | A1 | 1/2008 | Ito et al. |
| 2008/0100425 | A1 | 5/2008 | Kiribayashi |
| 2008/0180234 | A1* | 7/2008 | Yamanaka et al. ............ 340/438 |
| 2008/0198024 | A1 | 8/2008 | Kamizono et al. |
| 2009/0128344 | A1* | 5/2009 | Sundaram et al. ......... 340/573.1 |

FOREIGN PATENT DOCUMENTS

| | | |
|---|---|---|
| JP | 11-271463 | 10/1999 |
| JP | 2003-232866 | 11/2001 |
| JP | 2006-027591 | 2/2006 |
| JP | 2008-181806 | 8/2008 |

OTHER PUBLICATIONS

Office Action dated Dec. 7, 2010 in Japanese Application No. 2008-316124 with English translation thereof.

* cited by examiner

*Primary Examiner* — George Bugg
*Assistant Examiner* — Kerri McNally
(74) *Attorney, Agent, or Firm* — Harness, Dickey & Pierce, PLC

(57) ABSTRACT

A capacitive occupant detection system comprises a capacitive sensor and a seat frame located under the capacitive sensor through a seat cushion. The seat frame is electrically connected with the ground potential level of the vehicle. A water proof layer is placed above the seat frame. The water proof layer prevents water from penetrating the seat cushion to reach to the seat frame, even if water poured on the seating part. The water proof layer suppresses resistance decrease of resistive component between the capacitive sensor and the seat frame resulting from water poured on the seat.

10 Claims, 3 Drawing Sheets

CAPACITIVE OCCUPANT DETECTION SYSTEM

CROSS REFERENCE TO RELATED APPLICATION

This application is based on Japanese Patent Application No. 2008-316124 filed on Dec. 11, 2008, the contents of which are incorporated herein by reference in its entirety.

FIELD OF THE INVENTION

The present invention relates to a capacitive occupant detection system for detecting occupant on a seat. Specifically, the present invention relates to a capacitive occupant detection system for a vehicle having a capacitive sensor on a seat for a passenger, which detects capacitance of object on the seat accurately by reducing an influence of water on the capacitive sensor when water is accidentally or intentionally poured on the seat.

BACKGROUND OF THE INVENTION

Conventionally, a capacitive occupant detection system is known in the art. One system includes a mat shaped capacitive sensor and an electronic control unit (ECU) for detecting occupant. The capacitive sensor is responsive to differences of a weak electric field which is generated between a main electrode arranged inside a seat and a body member of the vehicle, and is arranged to output the differences in a current form or a voltage form. One example is disclosed in JP H11-271463A.

For example, if a seat is vacancy, only air is supplied between the electrodes of the capacitive sensor. In another situation, if a child restraint system (CRS), such as a junior restraint device, is mounted on the seat, the CRS or the CRS with a child is interposed between the electrodes. Further, if an adult human is on the seat, a large human body is interposed between the electrodes.

Here, the relative dielectric constant of air is about 1.0. The relative dielectric constant of the CRS is in a range from about 2.0 to about 5.0. The value varies depending on material of the CRS. The relative dielectric constant of a human body is about 50.0. Thus, the relative dielectric constants of air, the CRS, and a human body differ, respectively. Therefore, the capacitance between the electrodes of the capacitive sensor is changed according to the interposed objects.

The capacitive sensor is responsive to differences of a weak electric field caused by the difference of the capacitance. The capacitive sensor outputs the differences in a current form or a voltage form. Then, the ECU performs an occupant discrimination based on the output. That is, the ECU determines whether the seat is vacancy, the seat is mounted with a CRS, or the seat is occupied with an adult. In addition, an airbag ECU determines whether a bag member can be enabled to deploy or be disabled to deploy based on the determination result of the occupant detection ECU. In detail, the bag member is disabled to deploy, when the seat is vacancy or the seat is occupied with a CRS. On the other hand, the bag member is enabled to deploy, when an adult sits down on the seat.

It is known in the art that a capacitive sensor which detects water poured on the seat, and more clearly discriminates a case where the seat is occupied with a passenger and a case where the seat is vacancy. One example is disclosed in U.S. Pat. No. 7,497,465 (JP 2006-27591A).

If water is poured on the seat, it makes difficult to discriminate objects on the seat, since the relative dielectric constant of water is about 80.0 which is larger than the relative dielectric constant of a human body. For this reason, the above example of the capacitive sensor is newly installed with a sub electrode for detecting water. The sensor outputs differences of the weak electric field between the sub-electrode and the main electrode arranged inside the seat for occupant detection in a current form or a voltage form. The sensor enables the ECU to detect water on the seat.

The conventional capacitive sensor having the above-mentioned configuration outputs differences of the weak electric field generated between the electrodes in a current form or a voltage form. That is, different levels of current or voltage is generated according to conditions of the electric field between the electrodes, which reflect situations on the seat, such as whether a passenger sits down on the seat or not, what kind of passenger is on the seat, whether water is on the seat or not. The discrimination between a passenger and water is performed based on a current value or a voltage value. The current value and the voltage value may be hereinafter also referred to as a current value etc. or a detected value.

The current value etc. is outputted as a value which relates to both a capacitive component between the electrodes and a resistive component on a circuit providing the capacitive sensor. That is, when detecting the current value etc. between the electrodes in the capacitive sensor, the current value etc. is detected as a value affected by the influence of the resistive component of the circuit.

The resistive component includes resistances of objects, such as a human (passenger), water, and air etc., which is interposed between the electrodes. This is understandable, since a human body and water etc. can be expressed in an electric equivalent circuit which is a parallel circuit of a resistance and a capacitor.

Therefore, in a case of using a capacitive sensor, if occupant etc. is determined based on an amount of detected current value flowing between the electrodes, the detected current value includes current component flowing through the parallel circuit of the capacitor and the resistance which are formed between the electrodes. The occupant discrimination using the above current value as it is as a discrimination factor has an improvement limit in accuracy. That is, the occupant discrimination using the current value etc. does not use a pure capacitance between the electrodes as a discrimination factor, e.g., when water is poured on the seat. Therefore, there may be a case where it is impossible to discriminate exactly.

There is a conventional technology which can improve discrimination accuracy among a passenger and water etc. For example, a capacitive occupant detection sensor is disclosed in US Application Publication 2008/0100425 (JP 2008-111809.) The sensor includes a power supply section which generates alternating voltage, a main electrode arranged in a seating part of the seat of the vehicle, and a main wiring part which connects the power supply section and the main electrode. The sensor further includes a guard electrode disposed between the main electrode and the seat frame electrically connected to the ground potential level of the vehicle. The guard electrode eliminates that an electric field is formed between the seat frame and the main electrode. The sensor further includes an impedance calculation section, a real part and imaginary part calculation section, and a discriminating section. Further, in addition to the above elements, the sensor has a sub electrode and a switching section. The sub electrode is located to be apart from the main electrode, and to be next to the main electrode. The switching section switches between an occupant detection mode and a water detection mode for generating an electric field between the main electrode and the sub electrode.

In the occupant detection mode, the impedance calculation section calculates impedance through the power supply section, the main wiring part; the main electrode, and the vehicle body. The real part and imaginary part calculation section calculates a real part and an imaginary part of the impedance based on the calculated impedance. The discriminating section discriminate a passenger on the seat based on the imaginary part of the calculated impedance.

In the water detection mode, the impedance calculation section calculates the second impedance including main-sub impedance between the main electrode and the sub electrode. That is, the second impedance is impedance through the power supply section, the main wiring part, the main electrode, the sub electrode, and, the vehicle body. Hereinafter, this circuit is referred to as a water detecting circuit. In this case, a discrimination section detects water on the seat based on the imaginary part calculated in the real part and imaginary part calculation section in the water detection mode. Here, the water detection includes meaning of determination of whether water is on the seat or not, and determination of water condition, such as a discrimination between water and salted water.

In the water detection mode, it is possible to discriminate water on the seat based on the imaginary part of the second impedance of the water detecting circuit. For example, if water interposes between the main electrode and the sub electrode, the imaginary part of the main-sub impedance becomes large, and the imaginary part of the second impedance also becomes large simultaneously. Here, the imaginary part of the second impedance of the water detecting circuit corresponds to a capacitive component between the main electrode and the sub electrode, i.e., the main-sub impedance. Therefore, the discriminating accuracy for water on the seat can be improved.

SUMMARY OF THE INVENTION

However, a sensor disclosed in the patent documents can not detect water supplied to the seat cushion disposed between the capacitive sensor and the seat frame. In this case, an electric conduction path may be formed between the capacitive sensor and the seat frame, and a resistance between the capacitive sensor and the seat frame is decreased. For this reason, the capacitive sensor outputs a detection signal that is the similar in the case where the capacitance is increased. As a result, there is a problem that proper occupant detection becomes impossible or hardly available.

For example, if the seat is vacancy or is mounted with a CRS, the capacitive sensor must contribute an airbag OFF determination where the airbag device is disabled to deploy. However, if water makes the detected signal to indicate an increasing of the capacitance, the capacitive sensor unintentionally contributes to perform an airbag ON determination where the airbag is enabled to deploy.

It is an object of the present invention to provide an improved capacitive occupant detection system capable of performing an occupant detection properly.

It is still another object of the present invention to provide a capacitive occupant detection system capable of performing an occupant detection properly even if water is poured on the seat.

It is another object of the present invention to provide a capacitive occupant detection system capable of performing occupant detection properly by reducing an influence of water poured on the seat.

In an aspect of the present invention, a capacitive occupant detection system which detects whether a passenger is on a seat or not based on a current or voltage according to differences of a weak electric field generated between a ground potential level of a vehicle and an electrode arranged inside the seat of the vehicle. The system comprises a capacitive sensor provided as the electrode, and a seat frame located under the capacitive sensor through a seat cushion and electrically connected with the ground potential level of the vehicle. The system further comprises means for suppressing decrease in resistance of resistive component between the capacitive sensor and the seat frame, the resistance decrease resulting from water poured on the seat.

In another aspect of the present invention, the suppressing means includes a water proof layer which is disposed between the capacitive sensor and the seat frame, and prevents water from penetrating the seat cushion to reach to the seat frame even if water is poured on the seat.

In another aspect of the present invention, the suppressing means includes a water proof layer which is disposed above the capacitive sensor and on a back side of a surface material of the seat, and prevents water from penetrating the seat cushion to reach to the seat frame when water is poured on the seat.

In another aspect of the present invention, the suppressing means includes a water absorption layer which is disposed above the capacitive sensor and on a back side of a surface material of the seat, and holds water by absorption when water is poured on the seat.

In another aspect of the present invention, the suppressing means includes an insulation layer provided on a surface of the seat frame located under a seating part of the seat.

In another aspect of the present invention, the seat includes a seating part, a back rest part, and a joint part which connects the seating part and the back rest part, and the suppressing means includes a seat cushion of the seating part having an upper surface which defines a plurality of grooves arranged with predetermined intervals. The grooves are formed to extend in and to be sloped along a direction between a front end of the seating part and the joint part. The upper surface of the seat cushion includes surfaces of the grooves being waterproofed. The seat cushion is formed so that the grooves are communicated to a bottom of the vehicle by penetrating the seat cushion in a downward direction at the joint part.

BRIEF DESCRIPTION OF THE DRAWINGS

Additional objects and advantages of the present invention will be more readily apparent from the following detailed description of preferred embodiments when taken together with the accompanying drawings. In which.

DETAILED DESCRIPTION OF THE PREFERRED EMBODIMENTS

A plurality of embodiments of the present invention are described in detail referring to the attached drawings. However, in all drawings attached on the specification, identical reference numbers and symbols are used for indicating corresponding components and parts, and redundant explanations are omitted in some following cases.

First Embodiment

Figure 1:
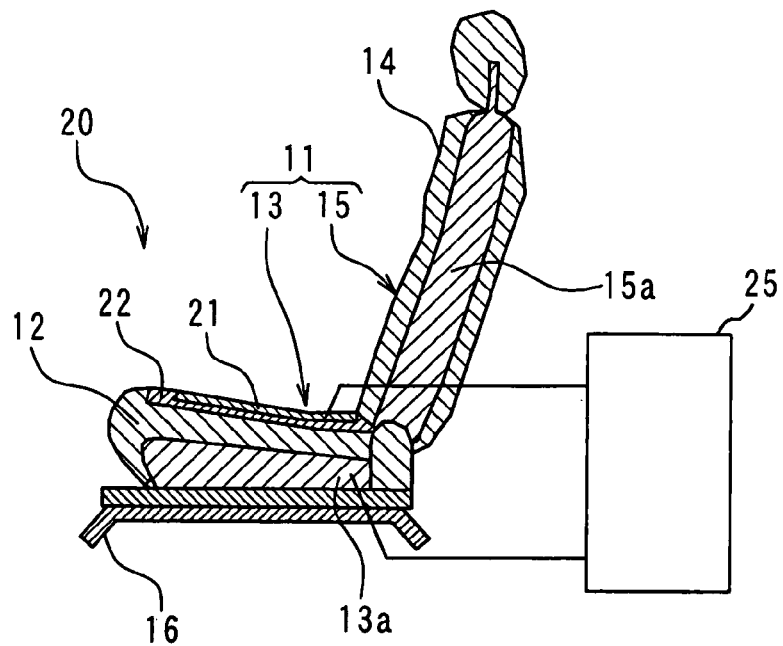
FIG. 1 is a drawing which shows a configuration of a capacitive occupant detection system according to a first embodiment of the present invention.

FIG. 1 is a drawing which shows a configuration of a capacitive occupant detection system according to a first embodiment of the present invention.

Referring to FIG. 1, a seat 11 for a vehicle has a seating part 13 and a back rest part 15. The seating part 13 has a seat cushion 12 on which a passenger sits down. The back rest part 15 has a back cushion 14 on which a passenger leans one's back. A bottom seat frame 13a is disposed in a bottom part of the seating part 13. The bottom seat frame 13a is electrically connected with a vehicle body 16 which obtains a ground potential level of the vehicle. The back rest part 15 is equipped with a back frame 15a which is electrically connected with the vehicle body 16.

In the first embodiment, the capacitive occupant detection system 20 is provided with a capacitive sensor 21 which is disposed above the seat cushion 12 of the seating part 13. As a result, the seat cushion 12 is disposed between the capacitive sensor 21 and the bottom seat frame 13a. The capacitive occupant detection system 20 is further provided with a water proof layer 22. The water proof layer 22 is arranged between the capacitive sensor 21 and the bottom seat frame 13a. The water proof layer 22 is made by water proof materials, such as PET (Polyester) and PEN (Polyethylene naphthalate).

The water proof layer 22 spreads over a whole undersurface of the capacitive sensor 21. The water proof layer 22 has an area larger than the whole surface of the capacitive sensor 21. The water proof layer 22 prevents water from reaching to the bottom seat frame 13a even if some water poured on the seating part 13. The water proof layer 22 covers the whole upper surface of the bottom seat frame 13a at least. The water proof layer 22 may be referred to as a water proof sheet or a water barrier. The water proof layer 22 provides means for suppressing decrease in resistance of resistive component between the capacitive sensor 21 and the seat frame 13a resulting from water.

Referring to FIG. 2, a method and measure to detect capacitance of an object existing on the seat 11 by using the capacitive sensor 21 is explained. The occupant detection ECU 25 connected with the capacitive sensor 21 and the seat frames 13a and 15a generates a sensing voltage which is a sine-wave voltage of predetermined frequency and supplies the sensing voltage to the capacitive sensor 21. Then, the lines of electric force are generated in accordance with a weak electric field from the capacitive sensor 21. The occupant detection ECU 25 measures a capacitance which is sensed by the line of electric force generated from the capacitive sensor 21.

Figure 2A:
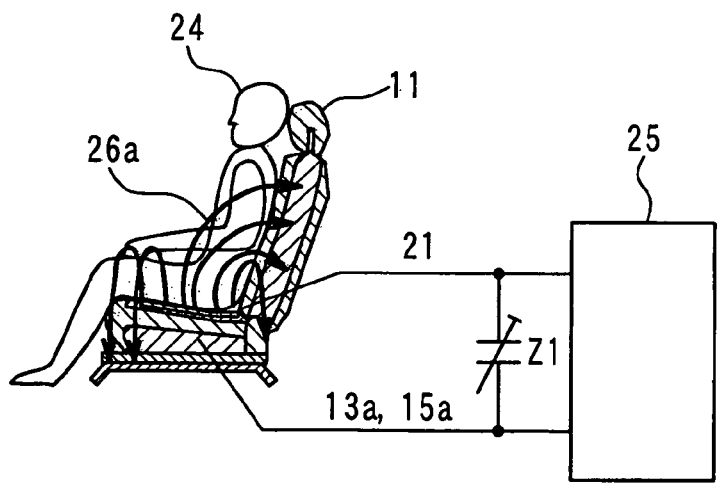
FIG. 2A is an explanatory drawing for detecting capacitance of an adult human etc. by using a capacitive sensor.

It is assumed that an adult human sits down on the seat 11 as shown in FIG. 2A. The lines of electric force is modulated and changed into a form 26a according to the human body. The changed and modulated amount of the lines of electric force is outputted from the capacitive sensor 21 and is monitored by the occupant detection ECU 25 in a current form or a voltage form. The occupant detection ECU 25 detects an impedance Z1 based on the output signal and determines that an object on the seat 11 is an adult human 24 based on the impedance Z1. In other words, the occupant detection ECU 25 measures a capacitance which is sensed by the line of electric force 26a generated from the capacitive sensor 21.

Figure 2B:
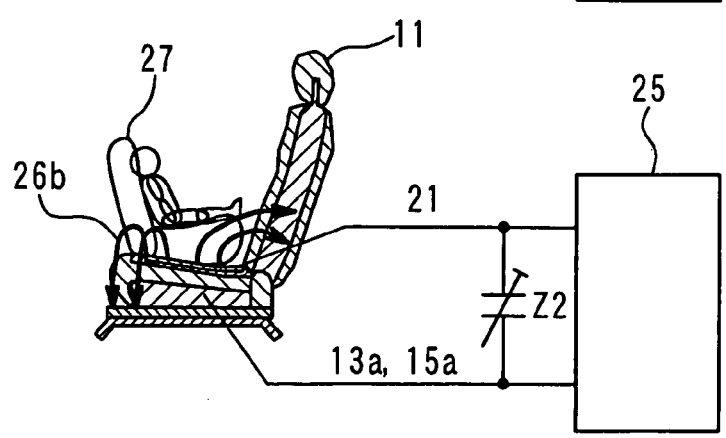
FIG. 2B is an explanatory drawing for detecting capacitance of a CRS by using a capacitive sensor.

It is assumed that a CRS 27 with a child is mounted on the seat 11 as shown in FIG. 2B. The occupant detection ECU 25 supplies the sensing voltage which is a sine-wave voltage of predetermined frequency to the capacitive sensor 21. The lines of electric force are generated in accordance with a weak electric field from the capacitive sensor 21. The lines of electric force is modulated and changed in a form 26b according to the CRS 27. The occupant detection ECU 25 detects impedance Z2 based on the output signal and determines that an object on the seat 11 is a CRS 27 based on the impedance Z1. The impedance Z2 is greater than the impedance Z1.

If the seat 11 is vacancy, the occupant detection ECU 25 also monitors the output signal from the capacitive sensor 21. The occupant detection ECU 25 detects an impedance Z0 based on the output signal and determines that no object is on the seat 11 based on the impedance Z0.

As explained above, the capacitive sensor 21 outputs the signal which has different detected values according to the object placed on the seat 11. The occupant detection ECU 25 determines at least whether a passenger is on a seat or not. For example, the occupant detection ECU 25 is provided as a part of a passenger protection device, such as an airbag device. The occupant detection ECU 25 disables the passenger protection device, when an object on the seat 11 is not appropriate for activating the passenger protection device. For example, the occupant detection ECU 25 prohibits the airbag device from activating, when a CRS with a child is on the seat 11.

According to the capacitive occupant detection system 20 of the first embodiment, the water proof layer 22 is placed between the capacitive sensors 21 for detecting capacitance indicative of a human etc. and the bottom seat frame 13a. The water proof layer 22 spreads over a whole undersurface of the capacitive sensor 21. The water proof layer 22 has an area larger than the whole surface of the capacitive sensor 21. The water proof layer 22 prevents water from penetrating the seat cushion 12 to reach to the bottom seat frame 13a, even if water poured on the seating part 13. The waterproof layer 22 provides means for suppressing decrease in resistance of resistive component between the capacitive sensor 21 and the bottom seat frame 13a resulting from water. The water proof layer 22 provides means for preventing the bottom seat frame 13a from being wet by water poured on the seat 11.

According to the embodiment, even if water is poured on the seat 11, water is blocked by the water proof layer 22 and is prevented from penetrating the seat cushion 12 to reach to the bottom seat frame 13a. Therefore, it is possible to reduce influence of water from the influence described in the conventional technique. The poured water is prevented from being supplied to form or strengthen a conductive path between the capacitive sensor 21 and the bottom seat frame 13a. Therefore, a resistance between the capacitive sensor 21 and the bottom seat frame 13a is prevented from being decreased even if some water poured on the seat 11. It is possible to prevent a detected value of the capacitive sensor 21 from being behaved to indicate an increase of the capacitance relating to the capacitive sensor 21. As a result, the capacitive occupant detection system 20 is prevented from being impossible to perform proper occupant detection. In other words, at least a proper discrimination between a vacancy and occupancy can be performed by reducing the influence of water to the capacitive sensor 21 when water poured on the seat 11.

Second Embodiment

Figure 3:
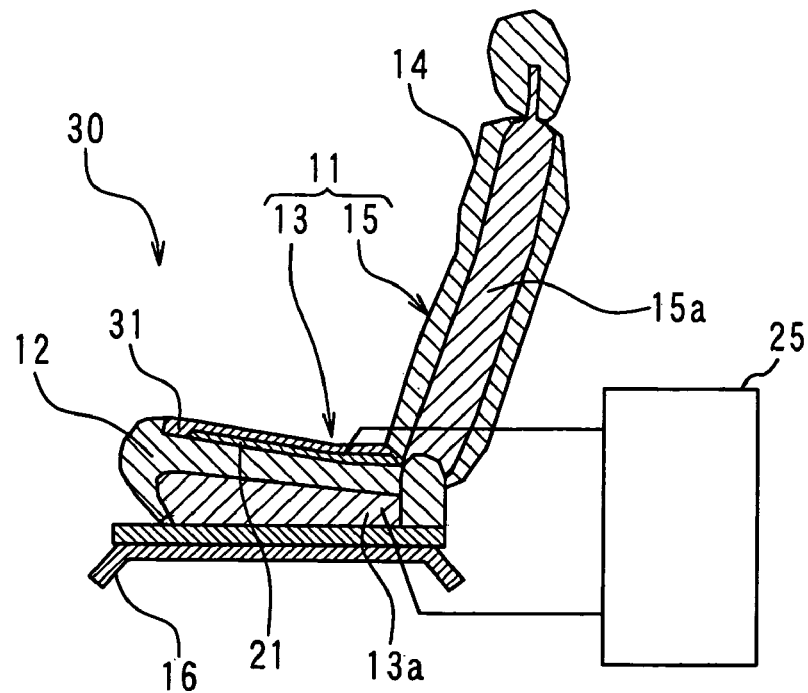
FIG. 3 is a drawing which shows a configuration of a capacitive occupant detection system according to a second embodiment of the present invention.

FIG. 3 is a drawing which shows a configuration of a capacitive occupant detection system according to a second embodiment of the present invention.

A difference between the capacitive occupant detection system 30 of the second embodiment and the capacitive occupant detection system 20 of the first embodiment is a location of a water proof layer 31. The water proof layer 31 is disposed above the capacitive sensor 21 and on a back side of a surface material of the seating part 13 of the seat 11. The water proof layer 31 is made of water proof material, such as a PET, and PEN etc. The water proof layer 31 covers both upper sides of the capacitive sensor 21 and the bottom seat frame 13a.

The water proof layer 31 spreads over a whole upper surface of the capacitive sensor 21. The water proof layer 31 has an area larger than the whole surface of the capacitive sensor 21. The water proof layer 31 prevents water from penetrating the seat cushion 12 to reach to the bottom seat frame 13a, even if water poured on the seating part 13.

That is, according to the capacitive occupant detection system 30 of the second embodiment, even if water is poured on the seat 11, water is blocked by the water proof layer 31. The poured water is prevented from penetrating the seat cushion 12 to reach to the bottom seat frame 13a. Therefore, similar effects as described in the first embodiment can be achieved. The water proof layer 31 provides means for suppressing decrease in resistance of resistive component between the capacitive sensor 21 and the bottom seat frame 13a resulting from water. The water proof layer 31 provides means for preventing the bottom seat frame 13a from being wet by water poured on the seat 11.

Third Embodiment

Figure 4:
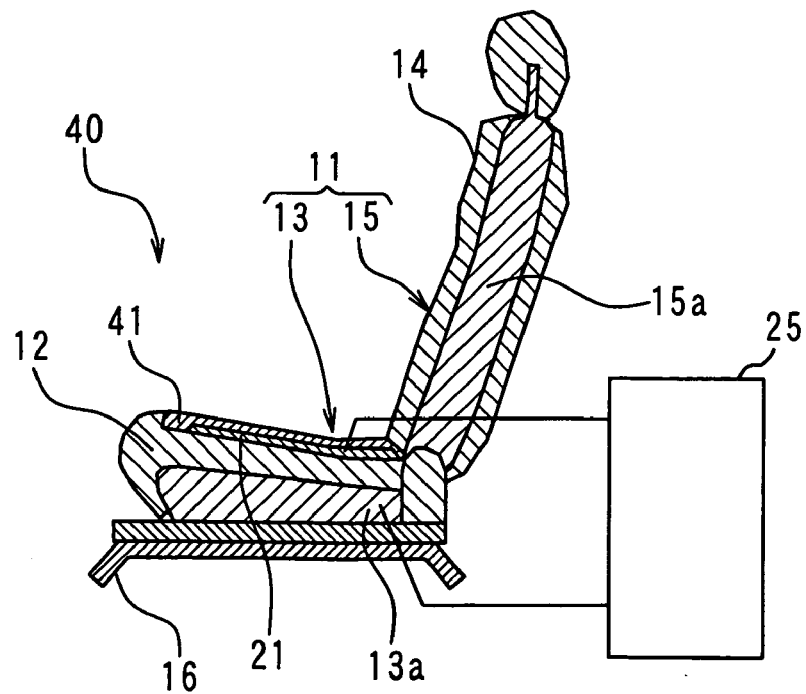
FIG. 4 is a drawing which shows a configuration of a capacitive occupant detection system according to a third embodiment of the present invention.

FIG. 4 is a drawing which shows a configuration of a capacitive occupant detection system according to a third embodiment of the present invention.

A difference between the capacitive occupant detection system 40 of the third embodiment and the capacitive occupant detection system 30 of the second embodiment is a material and function of a layer 41. The layer 41 is a water absorption layer 41 which holds water by absorption when water is poured on the seat. The water absorption layer 41 is made of super-absorbent polymers with high water absorbent and retention properties, such as AQUAPEARL® available from San-Dia Polymers, Ltd. or SANYO chemical industries, Ltd. The water absorption layer 41 is disposed above the capacitive sensor 21 and on a back side of a surface material of the seating part 13 of the seat 11. The water absorption layer 41 covers both upper sides of the capacitive sensor 21 and the bottom seat frame 13a.

The water absorption layer 41 spreads over a whole upper surface of the capacitive sensor 21. The water absorption layer 41 has an area larger than the whole surface of the capacitive sensor 21. The water absorption layer 41 prevents water from penetrating the seat cushion 12 to reach to the bottom seat frame 13a, even if water poured on the seating part 13.

That is, according to the capacitive occupant detection system 40 of the third embodiment, even if water is poured on the seat 11, water is blocked by the water absorption layer 41. The poured water is prevented from penetrating the seat cushion 12 to reach to the bottom seat frame 13a. Therefore, similar effects as described in the second embodiment can be achieved. The water absorption layer 41 provides means for suppressing decrease in resistance of resistive component between the capacitive sensor 21 and the bottom seat frame 13a resulting from water. The water proof layer 22 provides means for preventing the bottom seat frame 13a from being wet by water poured on the seat 11.

Fourth Embodiment

Figure 5:
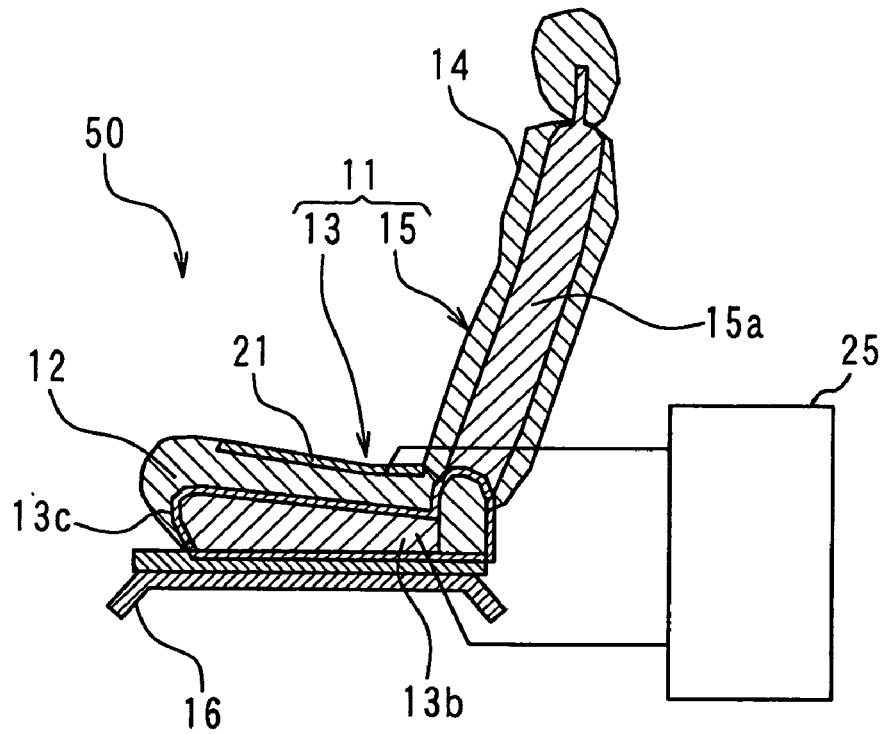
FIG. 5 is a drawing which shows a configuration of a capacitive occupant detection system according to a fourth embodiment of the present invention.

FIG. 5 is a drawing which shows a configuration of a capacitive occupant detection system according to a fourth embodiment of the present invention.

A difference between the capacitive occupant detection system 50 of the fourth embodiment and the capacitive occupant detection system 30 of the first embodiment is an electric insulation 13c coated on a surface of the bottom seat frame 13b. The fourth embodiment does not have any layer which prevent water from penetrating the seat cushion 12, but has a layer which prevent water from reaching to the bottom seat frame 13b.

According to the structure having an electric insulation 13c on the bottom seat frame 13b, even if water poured on the seat 11 penetrates the seat cushion 12 and reaches the bottom seat frame 13b, it is possible to avoid a formation or a strengthen of an electric conductive path between the capacitive sensor 21 and the bottom seat frame 13b.

According to the embodiment, discrimination among a vacancy, an occupancy etc. is performed based on conditions between the capacitive sensor 21 and the back seat frame 15a. In this embodiment, the occupant detection ECU 25 supplies the sensing voltage which is a sine-wave voltage of predetermined frequency to the capacitive sensor 21. The lines of electric force are generated in accordance with a weak electric field from the capacitive sensor 21. The lines of electric force is modulated and changed at a path between the capacitive sensor 21 and the back seat frame 15a. The occupant detection ECU 25 can detect a capacitance according to the lines of electric force between the capacitive sensor 21 and the back seat frame 15a.

According to the capacitive occupant detection system 50 of the fourth embodiment, the electric insulation 13c is provided on only the bottom seat frame 13b. Therefore, even if water poured on the seat 11 penetrates the seat cushion 12 and reaches the bottom seat frame 13b, it is possible to avoid a formation or a strengthening of an electric conductive path between the capacitive sensor 21 and the bottom seat frame 13b. In this case, a proper occupant detection, such as discriminating among a vacancy, an occupancy etc., can be performed based on the capacitance of object on the seat 11 measured between the capacitive sensor 21 and the back seat frame 15a. The electric insulation 13c provides means for suppressing decrease in resistance of resistive component between the capacitive sensor 21 and the bottom seat frame 13b resulting from water. The electric insulation 13c provides a layer which at least covers the bottom seat frame 13b from water. The electric insulation 13c provides means for preventing the bottom seat frame 13b from being wet by water poured on the seat 11.

Fifth Embodiment

Figure 6:
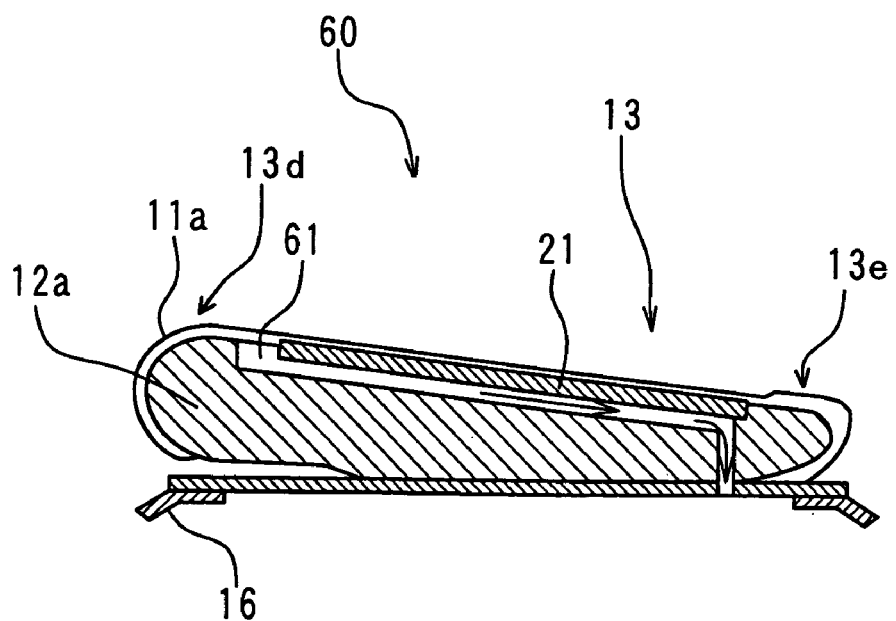
FIG. 6 is a drawing which shows a configuration of a seating portion of a seat for a capacitive occupant detection system according to a fifth embodiment of the present invention.

FIG. 6 is a drawing which shows a configuration of a seating portion of a seat for a capacitive occupant detection system according to a fifth embodiment of the present invention. FIG. 6 is a sectional view of a seating part 13 and shows a portion which does not have a bottom seat frame 13a. The seating part 13 has a front end 13d and a joint part 13e. The joint part 13e is a rear end of the seating part 13 and is connected with the back rest part 15 as shown in FIGS. 1 to 5.

A feature of the capacitive occupant detection system 60 of the fifth embodiment is a structure of seating part 13. A seat cushion 12a of the seating part 13 has an upper surface which defines a plurality of narrow grooves 61. The grooves 61 are arranged in parallel to each other with predetermined intervals. The grooves 61 are extending in straight. The grooves 61 are formed to extend in a direction between the front end 13d and the joint part 13e. The grooves 61 are formed to be sloped along a direction between the front end 13d and the joint part 13e. The grooves 61 are sloped downwardly from the front end 13d to the joint part 13e. The upper surface of the seat cushion 12a including surfaces of the grooves 61 are waterproofed. The seat cushion 12a is formed to provide a communicating passage for the grooves 61. The communicating passage penetrates the seat cushion 12a from the upper surface to the bottom surface at the joint part 13e. Further, an extended passage which penetrates the vehicle body 16 is provided from the lower end of the communicating passage. A seat cover 11a, such as fabric material, is placed on the seating part 13.

As a result, the grooves 61 are communicated to a bottom of the vehicle by penetrating the seat cushion 12a in a downward direction at the joint part 13e. The grooves 61 and the passages provides water bypass which collects water on the seating part 13 and guides water while preventing water from penetrating into the seat cushion 12a and from reaching to the bottom seat frame in the seating part 13.

According to the structure, if water is poured on the seat 11, the poured water flows along the grooves 61 on the seat cushion 12a in the direction shown by arrows in FIG. 6, and is drained to the outside through the bottom wall of the vehicle. Therefore, even if a lot of water is poured on the seating part 13 of the seat 11, since water is not kept on the seat cushion 12a, it is possible to prevent water from reaching to the bottom seat frame 13a for a long time. In other words, at least a proper discrimination between a vacancy and occupancy can be performed by reducing the influence of water to the capacitive sensor 21 when water poured on the seat 11. The seat cushion 12a with a waterproofed upper surface and grooves 61 provides means for suppressing decrease in resistance of resistive component between the capacitive sensor 21 and the bottom seat frame 13a resulting from water. The waterproofed upper surface provides a layer which covers both the capacitive sensor 21 and the bottom seat frame 13a from water. The waterproofed upper surface provides means for preventing both the seat cushion 12a and the bottom seat frame 13a from being wet by water poured on the seat 11.

The above-mentioned embodiments may be combined to achieve the object. For example, the bottom seat frame 13b with the electric insulation 13c in the fourth embodiment may be used instead of the bottom seat frames 13a in the preceding embodiments.

Although the present invention has been fully described in connection with the preferred embodiments thereof with reference to the accompanying drawings, it is to be noted that various changes and modifications will become apparent to those skilled in the art. Such changes and modifications are to be understood as being within the scope of the present invention as defined by the appended claims.

What is claimed is:

1. A capacitive occupant detection system which detects a condition on a seat based on a current or voltage according to differences of a weak electric field generated between a ground potential level of a vehicle and an electrode arranged inside the seat of the vehicle, comprising:
  a capacitive sensor provided as the electrode;
  a seat frame located under the capacitive sensor through a seat cushion and electrically connected with the ground potential level of the vehicle; and
  means for suppressing decrease in resistance of resistive component between the capacitive sensor and the seat frame, the resistance decrease resulting from water poured on the seat; wherein
  the seat includes a seating part, a back rest part, and a joint part which connects the seating part and the back rest part, and
  the suppressing means includes the seat cushion of the seating part having an upper surface which defines a plurality of grooves arranged with predetermined intervals, the grooves being formed to extend in and to be sloped along a direction between a front end of the seating part and the joint part, the upper surface of the seat cushion including surfaces of the grooves being waterproofed, and the seat cushion being formed so that the grooves are communicated to a bottom of the vehicle by penetrating the seat cushion in a downward direction at the joint part.

2. The capacitive occupant detection system in claim 1, wherein
  the suppressing means includes a water proof member which prevents the poured water from reaching to a surface of the seat frame.

3. The capacitive occupant detection system in claim 2, wherein
  the water proof member covers at least upper side of the seat frame.

4. The capacitive occupant detection system in claim 3, wherein
  the water proof member is disposed between the capacitive sensor and the seat frame.

5. The capacitive occupant detection system in claim 3, wherein
  the water proof member covers both upper sides of the capacitive sensor and the seat frame.

6. The capacitive occupant detection system in claim 5, wherein
  the water proof member is disposed between a surface material of the seat and the capacitive sensor.

7. The capacitive occupant detection system in claim 1, wherein
  the suppressing means includes a water proof layer which is disposed between the capacitive sensor and the seat frame, and prevents water from penetrating the seat cushion to reach to the seat frame even if water is poured on the seat.

8. The capacitive occupant detection system in claim 1, wherein
  the suppressing means includes a water proof layer which is disposed above the capacitive sensor and on a back side of a surface material of the seat, and prevents water from penetrating the seat cushion to reach to the seat frame when water is poured on the seat.

9. The capacitive occupant detection system in claim 1, wherein
  the suppressing means includes an electric insulation layer provided on a surface of the seat frame located under the seating part of the seat.

10. A capacitive occupant detection system which detects a condition on a seat based on a current or voltage according to differences of a weak electric field generated between a ground potential level of a vehicle and an electrode arranged inside the seat of the vehicle, comprising:
a capacitive sensor provided as the electrode;
a seat frame located under the capacitive sensor through a seat cushion and electrically connected with the ground potential level of the vehicle; and
means for suppressing decrease in resistance of resistive component between the capacitive sensor and the seat frame, the resistance decrease resulting from water poured on the seat; wherein
the suppressing means includes a water absorption layer which is disposed above the capacitive sensor and on a back side of a surface material of the seat, and holds water by absorption when water is poured on the seat.

* * * * *